United States Patent [19]
Matsui et al.

[11] Patent Number: 5,397,926
[45] Date of Patent: Mar. 14, 1995

[54] POWER DEMAND CONTROL

[75] Inventors: Nobuo Matsui; Hiroshi Tamura, both of Tokyo, Japan

[73] Assignee: Kabushiki Kaisha Toshiba, Kawasaki, Japan

[21] Appl. No.: 953,666

[22] Filed: Sep. 30, 1992

[30] Foreign Application Priority Data

Sep. 30, 1991 [JP] Japan .................................. 3-252361

[51] Int. Cl.6 .............................................. H02J 3/00
[52] U.S. Cl. ........................................ 307/32; 307/39; 307/40
[58] Field of Search ..................... 307/11, 31, 32, 38, 307/39, 40; 62/175, 230

[56] References Cited

U.S. PATENT DOCUMENTS

| | | | |
|---|---|---|---|
| 4,324,987 | 4/1982 | Sullivan, II et al. | 307/38 |
| 4,520,274 | 5/1985 | Stants | 307/39 |
| 4,788,827 | 12/1988 | Otani | 62/230 |
| 4,855,922 | 8/1989 | Huddleston et al. | 307/38 |
| 4,888,495 | 12/1989 | Feron et al. | 307/39 |
| 5,179,842 | 1/1993 | Kanazawa | 62/230 |
| 5,216,897 | 6/1993 | Tsuchiyama | 62/230 |

FOREIGN PATENT DOCUMENTS

| | | |
|---|---|---|
| 0431563 | 6/1991 | European Pat. Off. . |
| 63-302237 | 12/1988 | Japan . |
| 2071438 | 9/1981 | United Kingdom . |

*Primary Examiner*—Jeffrey A. Gaffin
*Attorney, Agent, or Firm*—Foley & Lardner

[57] ABSTRACT

A system and a method for saving power of an output variable apparatus such as an inverter air conditioner. A power demand controlling system includes: a power demand controlling unit for detecting and monitoring constantly an electric current flowing through the domestic lines; and power save controlling unit, connected to the domestic power lines and the output variable apparatus, for sending a power save signal to the apparatus, based on the current monitored by the power demand controlling unit, so that an output of the apparatus is reduced to a minimum value and after the power save signal is cancelled the output is returned gradually and stepwise to an original value.

11 Claims, 10 Drawing Sheets

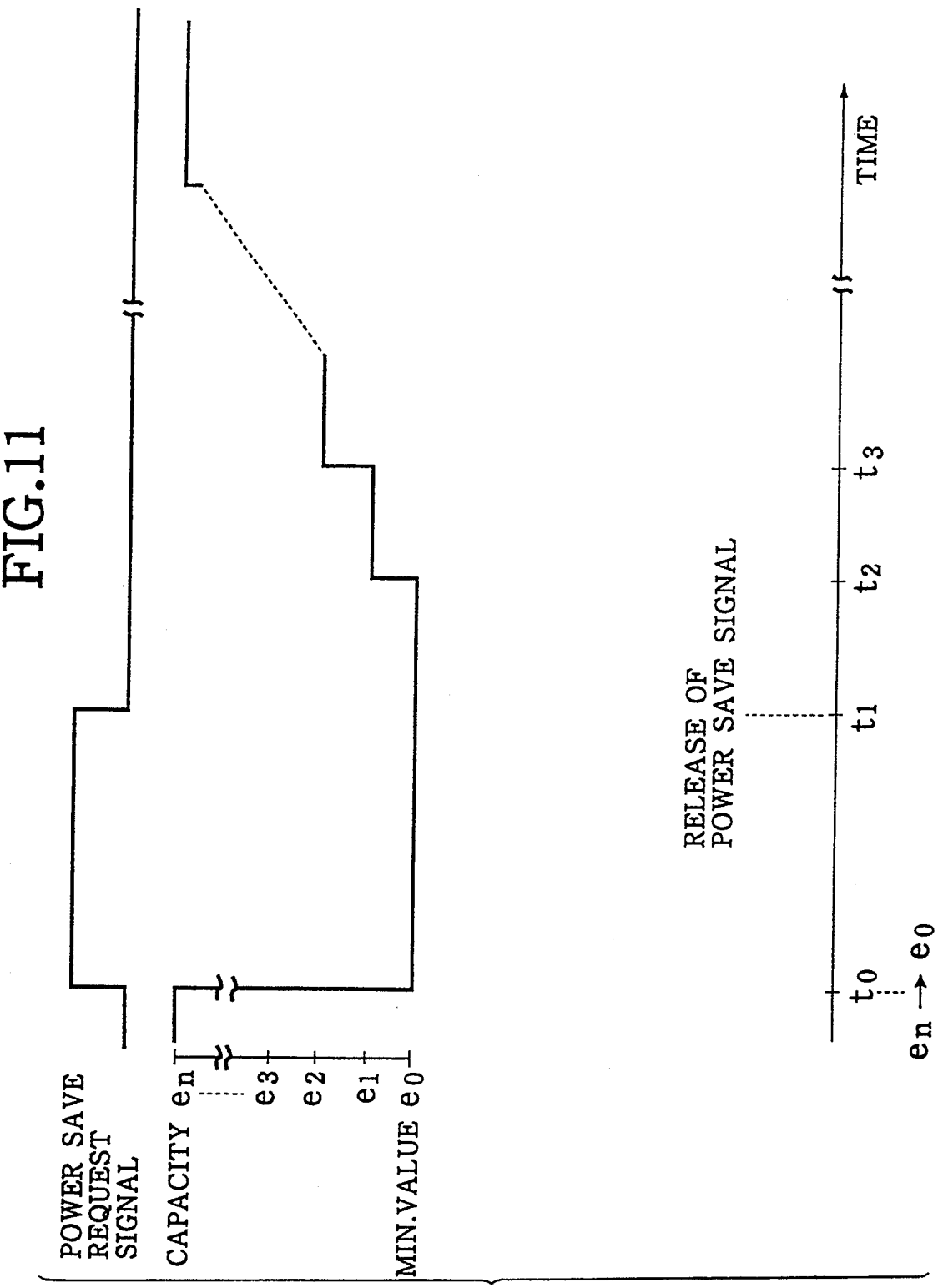

ered an additional system for controlling respective air conditioners in terms of capacity control level and so on, thus again causing a hike in the production cost.

POWER DEMAND CONTROL

BACKGROUND OF THE INVENTION

1. Field of the Invention

The present invention relates to a system and method for saving power.

2. Description of the Prior Art

In conventional power demand control, there is provided a power monitoring system called a power demand controller by which a power save requesting signal is sent to an electric apparatus such as an inverter air conditioner, when a working power exceeds a predetermined power value, so as to perform power save control. Then, the power save request is cancelled when the working power is detected to be below the predetermined value. Now, when the electric apparatus receives the power save requesting signal, an output thereof is, for example, reduced to an minimum output value to save power, whereas when the power save request is cancelled, the output is so controlled that it is jumped back to an original output. In the conventional power demand control described above, when the system is operating at a maximum output, for example, the system reduces an output thereof to the minimum. Then, after the power save request is cancelled, the output is returned to an initial maximum output. However, when the output is returned to the maximum again, the output will soon exceed the predetermined reference power value. As a result, the electric apparatus operates repeatedly between the minimum and maximum output, thus creating an unstable state.

Further, if the power demand control is such that even if the system receives the power save requesting signal the output is not reduced to the minimum, the output may exceed a maximum power limit. In that case, the power supply will be cut off by a circuit breaker and the electric apparatus will be inoperative.

Moreover, for the system where there are two operational modes of power save state and normal (two stage method), there may be caused a hunting due to an overshoot of the power on the occasion of the power being returned to the original one from the minimum.

Besides the two stage method, there is available a multistage method capable of controlling the power demand responsive to variable capacity. However, in order to set various levels for detecting the power (current), there is necessitated complicated circuits therefor, thus causing a hike in production cost. Moreover, when designed to control a plurality of output variable apparatus such as inverter air conditioners, there will be also necessitated an additional system for controlling respective air conditioners in terms of capacity control level and so on, thus again causing a hike in the production cost.

SUMMARY OF THE INVENTION

In view of the foregoing problems, it is therefore an object of the present invention to provide a power demand control system realizing smooth and stable power control.

To achieve the object, there is provided a power demand control system for saving power of output variable apparatus where power is supplied through domestic power lines, comprising: power demand controlling means for detecting and monitoring constantly an electric current flowing through the domestic power lines; and power save controlling means, connected to the domestic power lines and the output variable apparatus, for sending a power save signal to the apparatus, based on the current monitored by the power demand controlling means, so that an output of the apparatus is reduced to a minimum value and after the power save signal is cancelled the output is returned gradually and stepwise to an original value.

Other features and advantages of the present invention will become apparent from the following description taken in conjunction with the accompanying drawings.

BRIEF DESCRIPTION OF THE DRAWINGS

FIG. 11 shows another example of the timing chart of the power demand controlling system shown in FIG. 2.

DETAILED DESCRIPTION OF THE PREFERRED EMBODIMENTS

Features of the present invention will become apparent in the course of the following description of exemplary embodiments which are given for illustration of the invention and are not intended to be limiting thereof. Embodiments of the present invention will now be described with reference to the FIGS. 1-11.

Figure 1:
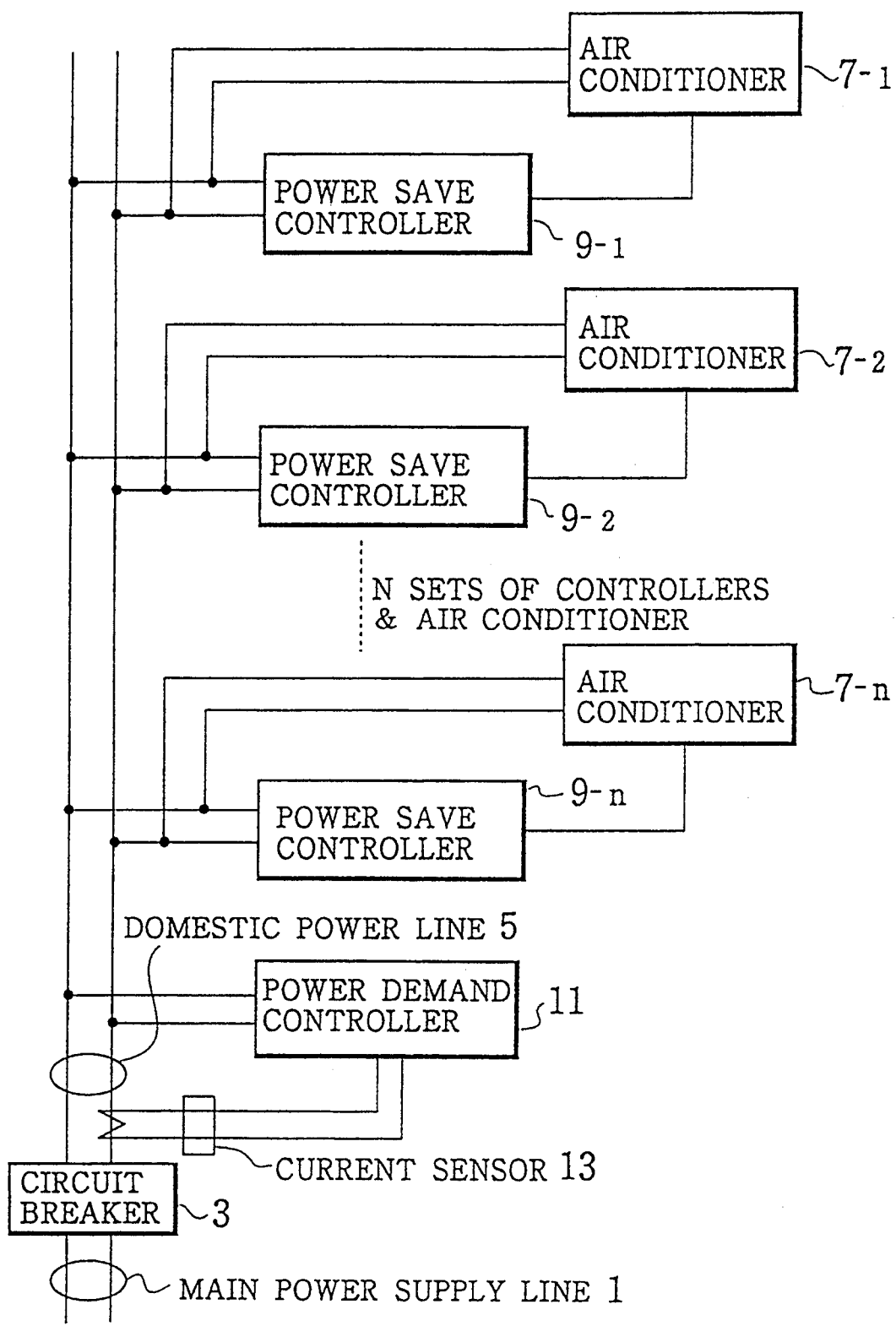
FIG. 1 shows a block diagram showing a configuration of a power demand controlling system according to the first embodiment of the present invention.

FIG. 1 shows a block diagram to show a configuration of a power demand controlling system according to the first embodiment. In the same figure, a main power line 1 connected to an A.C. commercial power supply is connected to a domestic power line 5 through a circuit breaker 3, and a plurality of air conditioners (7-1 through 7-n) are connected to the domestic power line 5. Also, a demand controller 11 is connected to the domestic power line 5, and there are provided a plurality of power save controllers (9-1 through 9-n) connected to corresponding air conditioners (7-1 through 7-n). Respective signal lines from the power save controller (9-1 through 9-n) are connected to air conditioners (7-1 through 7-n).

It is to be noted that relationship between the power save controller 9 and the power demand controller 11 may be expressed as a power demand slave controller and a power demand master controller.

There is provided a current sensor 13 in the domestic power line 5 close to the circuit breaker 3. The current sensor 13 detects an electric current flowing in the domestic power line 5. A current signal detected by the current sensor 13 is fed to the power demand controller 11.

The power demand Controller 11 is such that the working power is measured based on the current signal detected by the current sensor 13 so that the working power for each air conditioner is controlled in terms of power saving. It is to be noted that the air conditioner is such an output variable apparatus that there is a positive relation between the output thereof and the working power thereof. In other words, as the output of the air conditioner increases, so does the working power.

Figure 2:
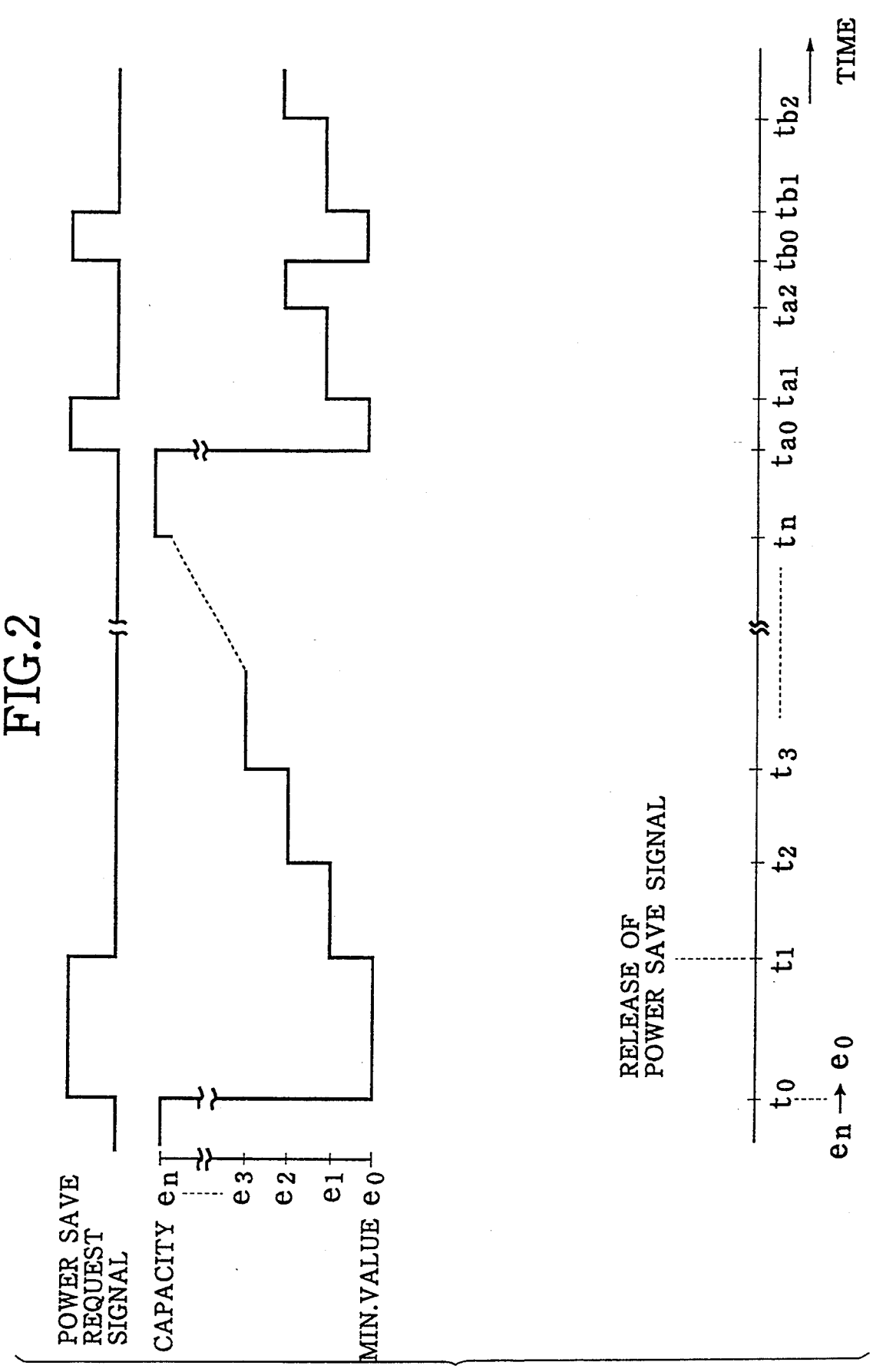
FIG. 2 shows a timing chart explaining an operation of the power demand controlling System shown in FIG. 1.

FIG. 2 shows a timing chart to describe an operation of the power demand controlling system.

The working power is kept constantly under surveillance by the power demand controller 11 through the current sensor 13. When the working power is detected to exceed a predetermined reference power value P1, a power save requesting signal is sent to each power save controller (9-1 through 9-n) provided corresponding to each air conditioner (7-1 through 7-n), through the power line 5. Referring to FIG. 2, when the power save controller 9 receives the power save requesting signal at the time of $t_o$, it controls output value $e_n$ of the air conditioner 7 to be reduced to an minimum value $e_o$.

When the power save requesting signal is cancelled after some time lapse ($t_1$), the output of the air conditioner is increased to $e_1$ by one step from $e_o$. Then, after time lapses for a predetermined period to reach time $t_2$, the output thereof is set to $e_2$ by one step from $e_1$. Similarly, from time $t_2$ onward, the output of the air conditioner is increased by a step per the predetermined period. Finally, at time $t_n$ the output is returned to an original output $e_n$ which is the output before the power save requesting signal is sent. As described above, the output of the air conditioner is not jumped back to the original output but is returned to the original output gradually and stepwise, so that the power used after release of power save requesting signal is minimized and the power used does not exceed the predetermined reference power value P1 immediately after the release of power save requesting signal as in the conventional practice, thus realizing a stable operation.

Moreover, when the power save requesting signal is received during time $t_1$ and $t_n$ in FIG. 2, the output is reduced to the minimum value $e_o$ then, so that a smooth and stable operation is realized by minimizing a jump of the output, thus also avoiding hunting.

Moreover, when the power save requesting signal is sent simultaneously to a plurality of air conditioners, a time constant associated with each apparatus is made variable so as to shift slightly the timing in which the output is returned to the original value, thus realizing a further smooth power demand control.

As shown in FIG. 11, it shall be appreciated that the output of the air conditioner for the first step during $t_1$ and $t_2$ can still be the minimum capacity $e_o$ immediately after the power save requesting signal is cancelled.

Figure 3:
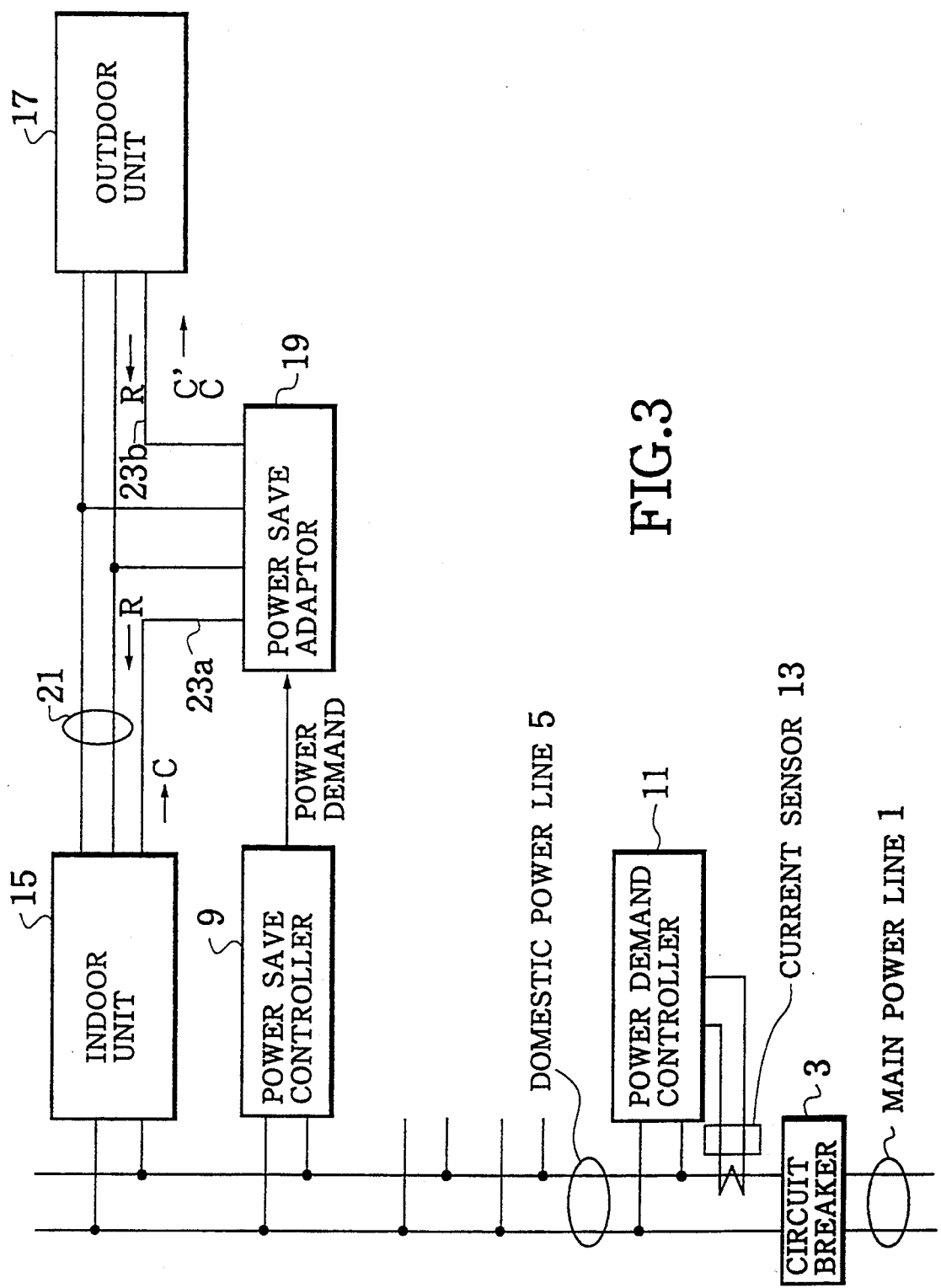
FIG. 3 shows a block diagram showing a configuration of the power demand controlling system according to the second embodiment.

FIG. 3 shows the second embodiment of the power demand controlling system. In the same figure; there are provided a split-type inverter air conditioner which is equipped with an indoor unit 15 and an outdoor unit 17. The indoor unit 15 and the outdoor unit 17 are connected through a pair of power lines 21 and signal lines 23a, 23b. Similar to FIG. 1, there are provided the main power line 1, the circuit breaker 3, the power demand controller 11, the current sensor 13, the power save controller 9, connected to the domestic power line 5, for saving a power of the indoor unit 15 and outdoor unit 17 of the split-type air conditioner, and a power save adaptor 19 which serves as signal conversion means through signal lines 23a, 23b between the indoor unit 15 and the outdoor unit 17. The power save requesting signal from the power save controller 9 is fed to the indoor unit and the outdoor unit through the power save adaptor 19. A communication from the indoor unit 15 to the outdoor unit 17 is performed through the signal lines 23a, 23b and one of power lines 21, whereas the communication from the outdoor unit 17 to indoor unit 15 is performed through the signal lines 23a, 23b and the other one of the power lines 21. Let us suppose that there is a positive relation between the working power of the air conditioner and an output requesting code sent from the indoor unit 15 toward the outdoor unit 17. The positive relation between A and B is such that as A decreases, so does B; the positive relation can be linear or non-linear.

Figure 4:
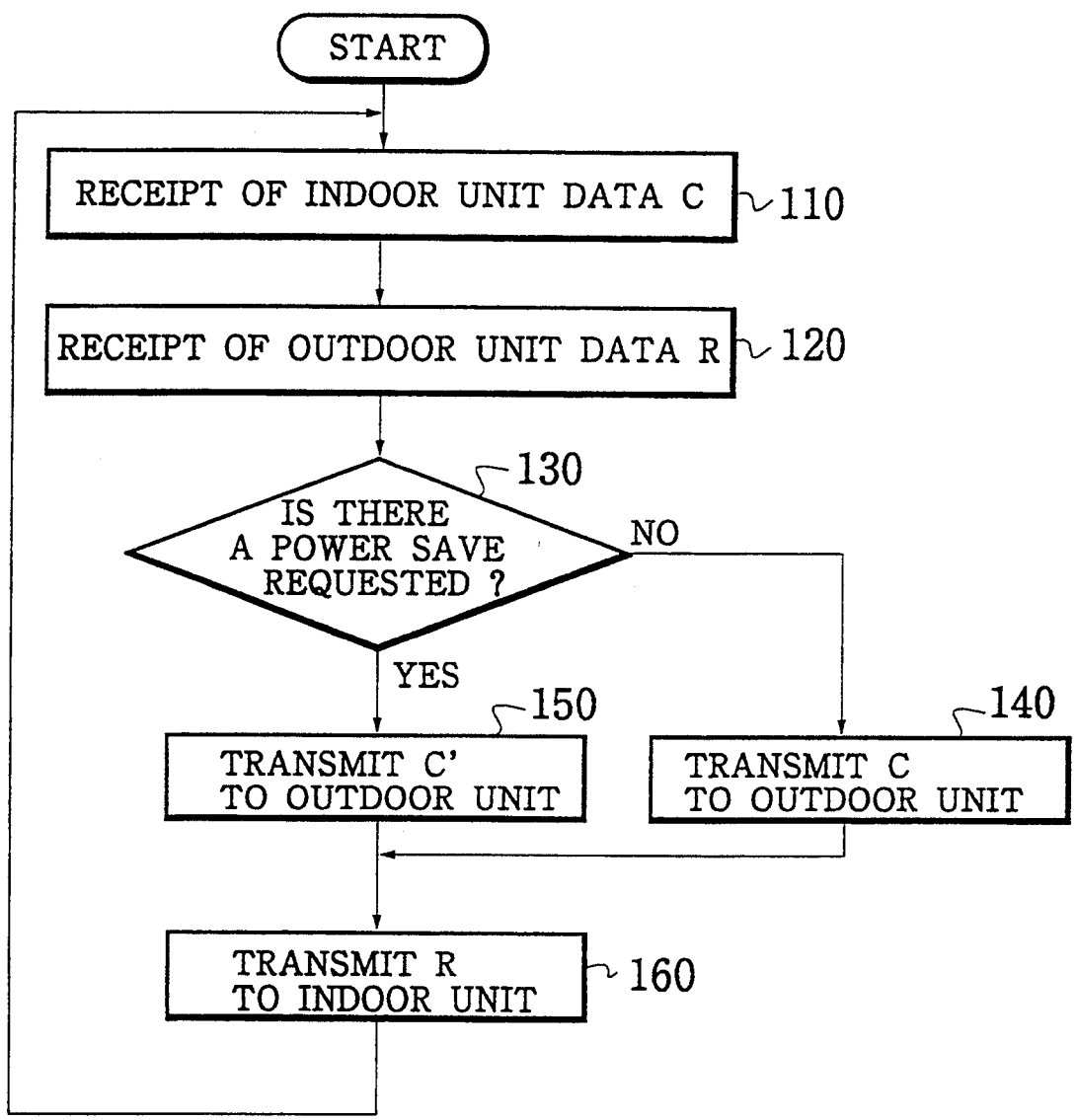
FIG. 4 shows a flowchart in which the operation of power demand controlling system shown in FIG. 3 is explained.

Referring to FIG. 4, an operation of the power demand controlling system shown in FIG. 3 will be described in detail.

The power save adaptor 19 is such that data C is received which serve to control an output from the indoor unit 15 to the outdoor unit 17 and data R is received from the outdoor unit 17 (step 110 and step 120) and then the adaptor 19 checks whether there is a power save requesting signal from the power save controller 9 through the power demand controller 11. When there is no power save requesting signal, the data C is sent from the indoor unit 15 to the outdoor unit 17 as it is (step 140). However, if there is the power save requesting-signal, the data C is arranged so as to be converted to data C' having a minimum output for saving the power, and the data C' is fed to the outdoor unit 17 (step 150). The minimum output can be arranged, for example, when the output is a class of code 1, the minimum output is set to 10 Hz, and for code 2 set to 20 Hz and so on. Thereafter, the data R received from the outdoor unit 17 is transmitted to the indoor unit 15 (step 160).

As described above, when there is the power save requesting signal, the indoor unit data C which serves to control the output of the outdoor unit 17 is converted to, say, a minimum output C' so as to save power. It is to be noted that the data C' is not limited to the minimum output, though, it will be effective to set a certain constant value such as a half of capacity of the apparatus or a minimum capacity. Accordingly, the power demand control system can be easily and economically built into the already available air conditioner or the like.

Figure 5:
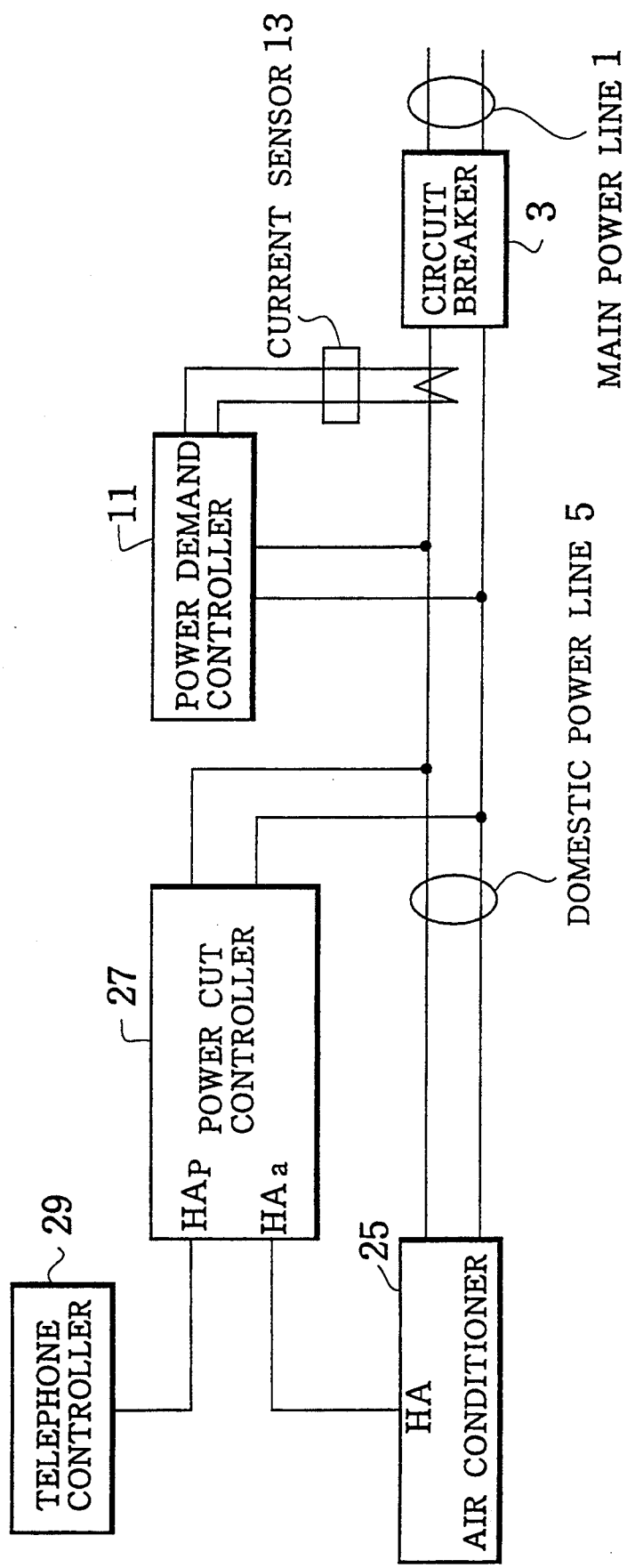
FIG. 5 shows a block diagram showing a configuration of the power demand controlling system according to the third embodiment.

Referring to FIG. 5, a power demand controlling system according to the third embodiment will be described.

In the same figure, there is provided a power cut controller 27 having a home automation (HA) terminal for controlling to activate and stop an air conditioner through a telephone controller 29 or a centralized controller. The power cut controller 27 is intended to be used for the air conditioner where there is no power demand controlling capability attached thereto. For the air conditioner with no power demand controlling capability, there is usually only one HA terminal, so that when the HA terminal is occupied by the telephone controller 29 or the like an apparatus for cutting power cannot be connected to the air conditioner. However, in this third embodiment, there is provided the power cut controller 27 so as to solve such a drawback.

Namely, similar to FIG. 1, there are provided the main power line 1, the circuit breaker 3, the power demand controller 11, the current sensor 13, an air conditioner 25, having a HA terminal, which is connected to the domestic power line 5, and the power cut controller 27 which has a HAp terminal connected to the telephone controller 29 and a HAa terminal connected to the air conditioner 25 and which is connected to the domestic power line 5 so that a power save requesting signal from the power demand controller 11 is received by means of power line transmission. The telephone controller 29 is controlled to switch on and off the air conditioner 29 based on an instruction from a telephone unit (not shown).

Figure 6:
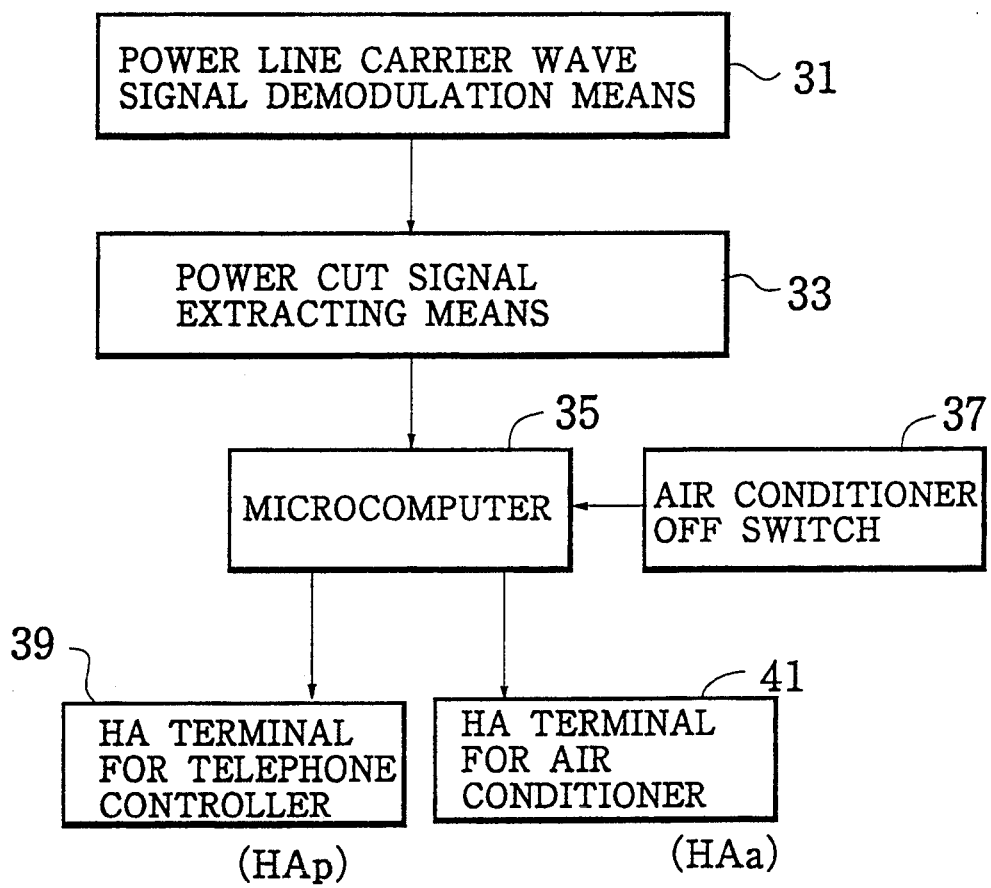
FIG. 6 shows a block diagram showing a configuration of a power cut controller employed in the power demand controlling system shown in FIG. 5.

Referring to FIG. 6, the power cut controller 27 comprises power line carrier wave signal demodulation means 31, power cut signal extracting means 31, one-chip microcomputer 35, switch 37 for stopping the air conditioner, the HAp terminal 39 for the telephone controller 29 and the HAa terminal 41 for the air conditioner 25.

In the power demand controlling system configured in FIG. 5, the power demand controller 11 constantly monitors the current I of the system through the current sensor 13 and sends to the power cut controller 27 a power cut requesting signal so that a power calculated from the current I stays below a predetermined contract demand. For instance, suppose a rated current $I_{max}$ is 20 A, the demand controller 11 sends a power cut requesting signal $P_{cut}$ to the power cut controller 27 by means of the power line transmission when the current I detected exceeds 90% (18 A) of the rated current $I_{max}$.

Figure 7:
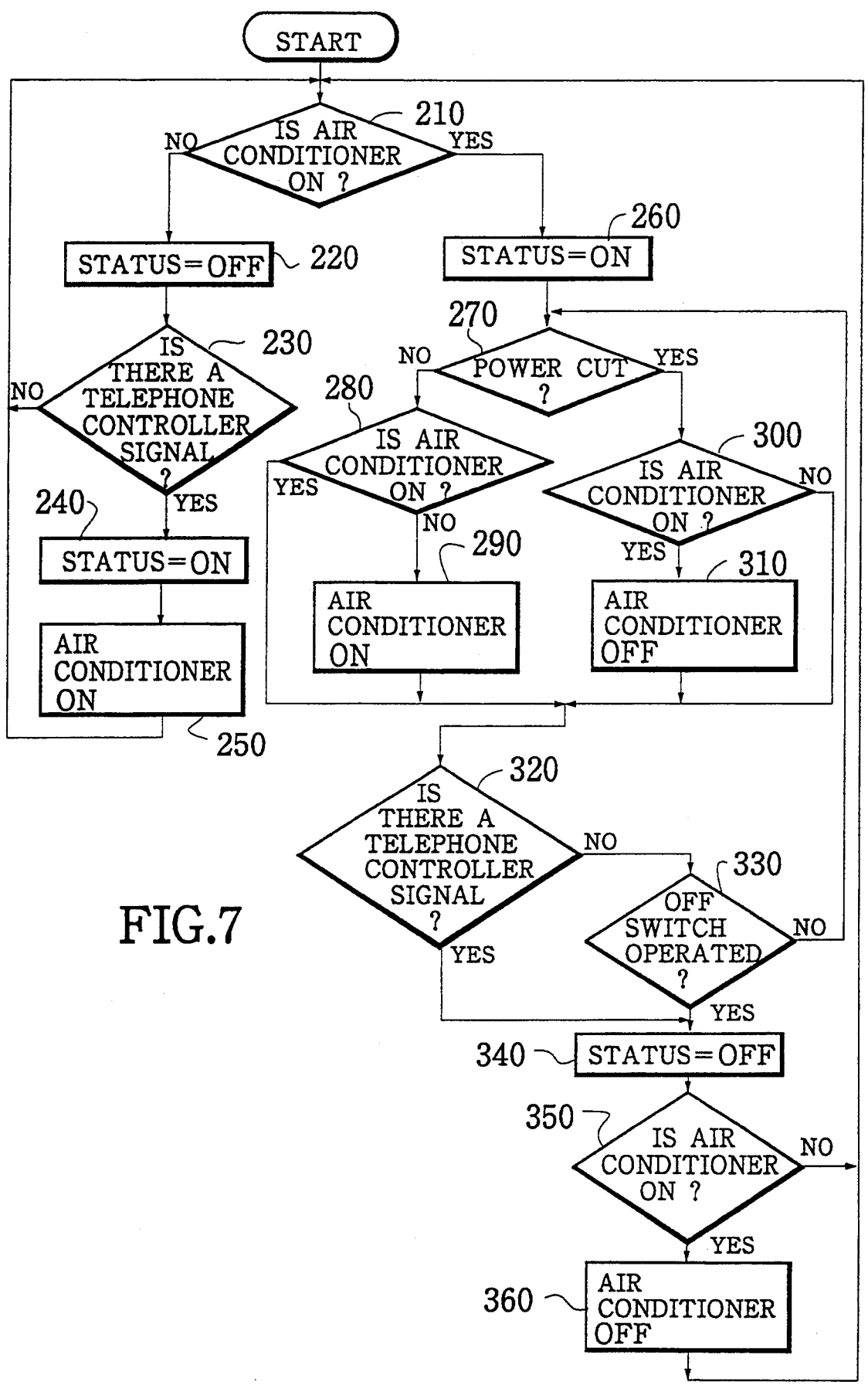
FIG. 7 shows a flowchart in which explained is the operation of power demand controlling system shown in FIG. 5.

Referring to FIG. 7, an operation of the power demand controlling system shown in FIG. 5 will be described.

The power cut controller 27, first, monitors the HAa terminal for the air conditioner 25, that is, the power cut controller 27 reads information at the HAa terminal as to whether "1" or "0" in order to check that the air conditioner 25 is operating or not (step 210). If the air conditioner 25 is in OFF state, proceed to step 220 so as to make a status of the HAp terminal for the power cut controller 27 to be OFF and proceed to check through the HAp terminal whether there is a signal from the telephone controller 29 (step 230). If there is no signal from the telephone controller 29, return to step 210; if there is a signal from the telephone controller 29, make the HAp status ON (step 240) and switch on the air conditioner 25 (step 250) then to return step 210.

In step 210, if the air conditioner 25 is ON, make the HAp status ON (step 260). Then demodulate a signal sent from the demand controller 11 by means of power line transmission so as to check whether the signal is a power cut requesting signal or not (step 270). If there is no power cut requesting signal, proceed to monitor HAa terminal whether the air conditioner is ON or not (step 280). Then, if the air conditioner is OFF, the power cut controller 27 switches on the air conditioner 25 by way of HAa terminal (step 290).

In step 270, when there is the power cut request signal, the power cut controller 27 proceed to monitor the HAa terminal so as to check whether the air conditioner is ON or not (step 300). Then, if the air conditioner 25 is ON, the power cut controller 27 switches off the air conditioner 25 by way of the HAa terminal (step 310) and proceeds to step 320.

In step 320, the power cut controller 27 monitors the HAp terminal to check whether there is a signal from the telephone controller 29. If there is no signal from the telephone controller 29, check to see if an OFF switch, provided in the power cut controller 27, for switching off the air conditioner 25 is operating or not (step 330). If the OFF switch is not operating, return to step 270; if the OFF switch is operating, make the HAp terminal status OFF (step 340). Then, the power cut controller 27 monitors the HAa terminal to see if the air conditioner 25 is ON or not (step 350). If the air conditioner 25 is OFF, the power cut controller 27 returns to step 210; if ON, the power cut controller 27 switches off the air conditioner 25 by way of the HAa terminal (step 360) and returns to step 210.

As described above, in the third embodiment, when the power cut requesting signal is supplied during the operation of the air conditioner. 25, the air conditioner is switched off. Now, seen from the telephone controller 29, the air conditioner seems to be still operating. Thus, the air conditioner 25 can be normally switched off by the telephone controller 29 during the power cut. On the other hand, the air conditioner 27 cannot be switched off from the air conditioner itself during the power cut, that is why in the power cut controller 27 there is provided the OFF switch for switching off the air conditioner 25. The OFF switch is operative only when the air conditioner is OFF under the power cut, thus even if pressed by mistake for other occasions, nothing will happen. It is preferred that the OFF switch is of a push type without a lock or is a toggle switch of non-locking type.

It is appreciated that a status signal of the HAp terminal can be connected to an indicator such as an LED, so as to indicate on what condition the air conditioner 25 is OFF.

Figure 8:
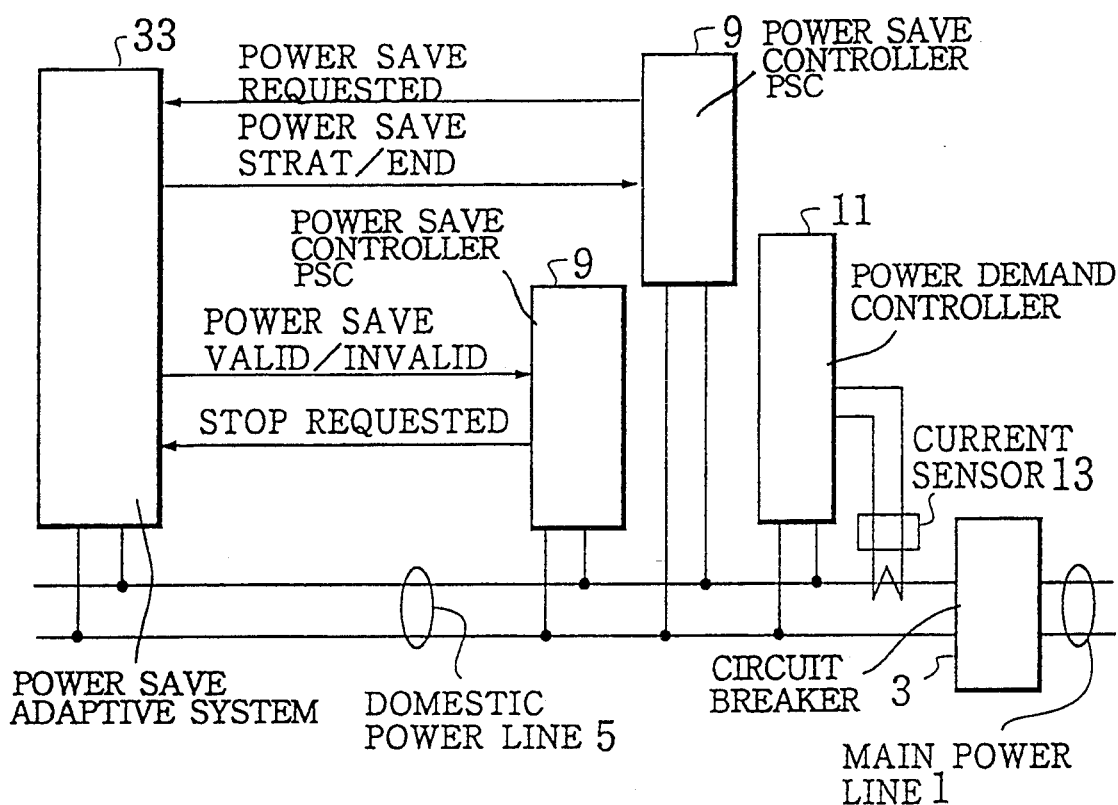
FIG. 8 shows a block diagram showing a configuration of the power demand controlling system according to the fourth embodiment.

Referring to FIG. 8, there is shown a power demand controlling system according to the fourth embodiment.

In the same figure, similar to FIG. 1 and FIG. 3, there are provided the main power line 1, the circuit breaker 3, the power demand controller 11, the current sensor, the power save controllers 9, and additionally provided is a power save adaptive system 33 which sends out a power save valid and power save invalid signals. In the conventional system of this sort, only sent back is a power save start/end signal which indicates that a request is made against the power save requesting signal. In this case, there is a possibility that a circuit breaker 3 may be activated without verifying whether a power demand control is valid or not. However, in this embodiment, the power save valid/invalid signal in addition to the power save start/end signal is sent back to the power save controller 9 when the power save adaptive system 33 such as an air conditioner or the like receives the power save requesting signal or stop signal from the power save controller 9.

Referring still to FIG. 8, the power demand controller 11 monitors the working power of whole-system through the current sensor 13 and communicates with the power save controller 9 by means of power line carrier.

For example, when current I of the whole system detected by the demand controller 11 through the current sensor 13 becomes current $I_{save}$ which is 80% of contract current $I_{max}$, the power demand controller 11 sends a power save requesting signal to the power save adaptive system 33 through the power save controller 9. Now, when the current I becomes 90% of the contract current $I_{max}$, the power demand controller 11 sends a power cut requesting signal to the power save adaptive system 33 through the power save controller 11. Accordingly, for example, when an operation capacity of the air conditioner is at a lowest level and the power demand control is no longer possible while the power save adaptive system 33 is receiving the power save requesting signal, the power save adaptive system 33 sends the power save invalid signal to the power demand controller 11 through the power save controller 9. Then, the power cut requesting signal is sent to the air conditioner. Namely, the power demand controller 11 operates to send the power cut requesting signal to the air conditioner (i.e. the power save adaptive system 33) even under the condition that the current I is below a power cut current $I_{cut}$ and above the power save current $I_{save}$, thus preventing the circuit breaker 3 from being activated.

Figure 9:
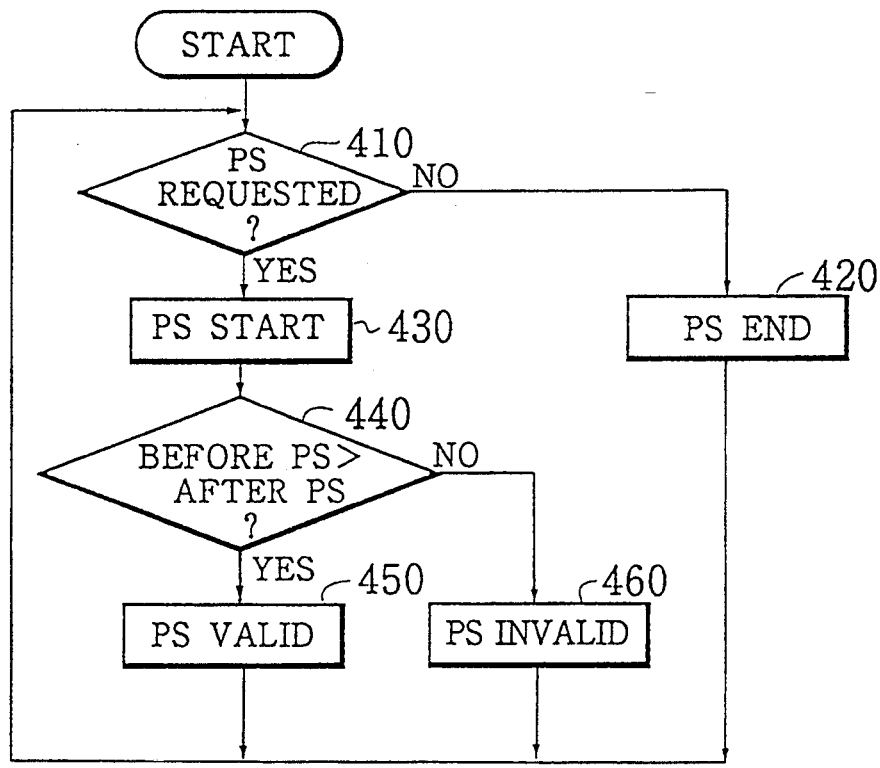
FIG. 9 shows a flowchart in which explained is the operation of power demand controlling system shown in FIG. 8.

Referring to FIG. 9, an operation of the power save adaptive system 33 will be described. It is to be noted that wording "power demand control" and "power save" may be interchangeably used in the specification. The power save adaptive system 33 checks to see if there is a power save (PS) requesting signal from the power demand controller 11 via the power save controller 9. If there is no power save requesting signal, the power demand control is terminated (PS END) (step 420). If there is a power save requesting signal, the power demand control starts (PS START) (step 430). Thereafter, a power prior to and a power after the power demand control are compared so that the power save valid signal is outputted when the power prior to the power demand control is greater than the power after the power demand control (step 450). When the power after the power demand control is equal to or greater than the power prior to the power demand control, the power save invalid signal is outputted (step 460).

Figure 10:
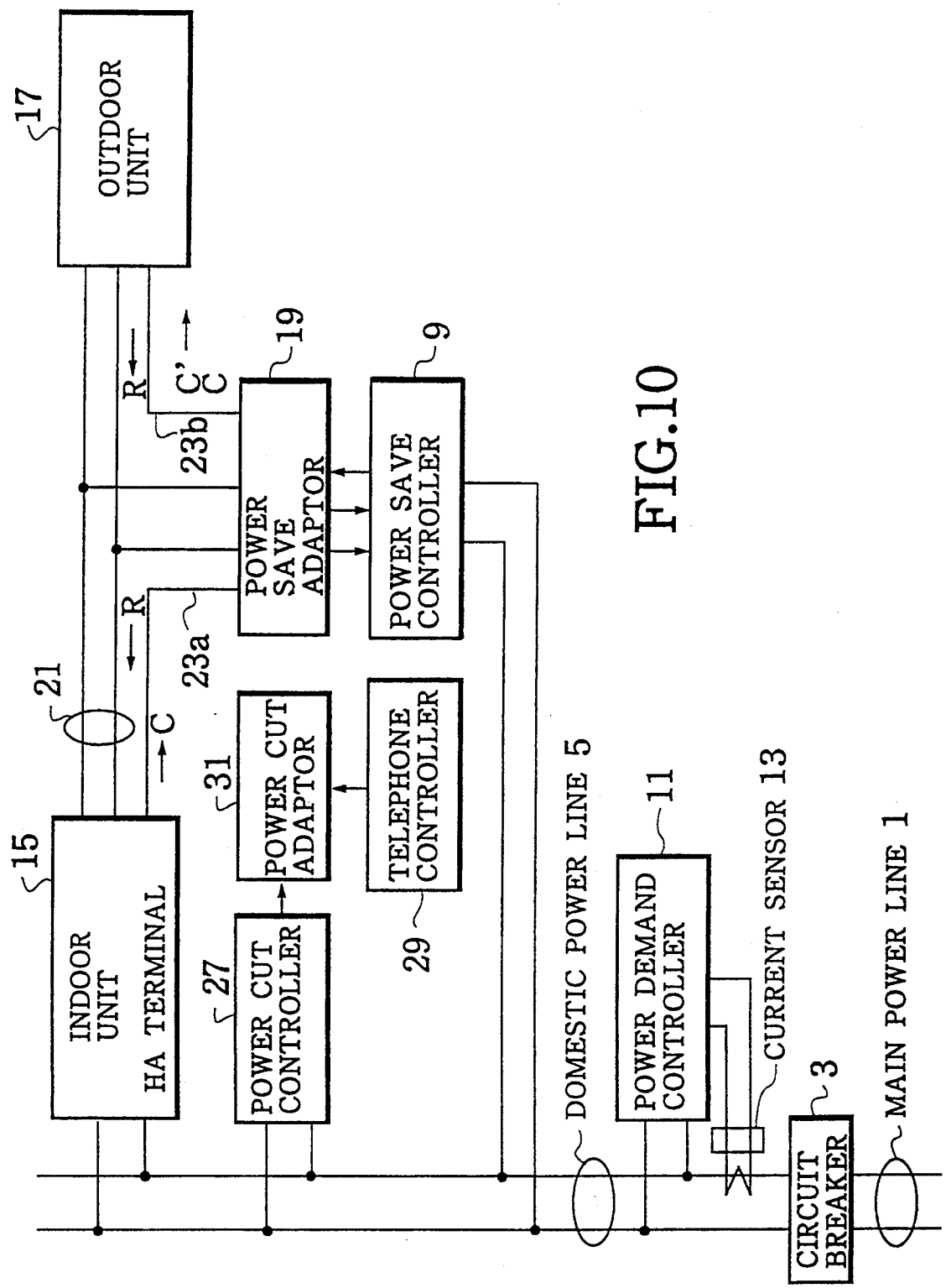
FIG. 10 shows a diagram block of a configuration of the power demand controlling system according to the fifth embodiment.

Referring to FIG. 10, there is shown a power demand controlling system according to the fifth embodiment.

The fifth embodiment can be considered in a way that the third embodiment shown in FIG. 5 and the fourth embodiment shown in FIG. 8 are synthesized together based on the second embodiment shown in FIG. 3. In the fifth embodiment, there are provided the main power line 1, the circuit breaker 3, the current sensor 13, the power demand controller 11, the indoor unit 15, the outdoor unit 17, the power save controller 9, the power save adaptor 19, the power cut controller 27, the telephone controller 29, and a power cut adaptor 31. The indoor unit 15 having the HA terminal is controlled by the telephone controller 29 through the power cut adaptor 31. The power save adaptor 19 is connected to both the indoor unit 15 and the outdoor unit 17 and is located between the indoor and outdoor units. In response to a power save requesting signal from the power demand controller 11, the power save adaptor 19 can send back a power demand receiving signal and a power save invalid signal to the power demand controller 11 through the power save controller 9.

In the power demand controlling system configured in the fifth embodiment, the power demand controller 11 observes the current flowing throughout the whole system. For example, when the current reaches to 80% of the contract current, the power demand controller 11 sends a power save requesting signal to the power save controller 9 through which the power adaptor 19 is controlled. As a result, the power save adaptor 19 converts data C sent from the indoor unit 15 for controlling the outdoor unit 17, to data C' of, say, a minimum output to perform the power demand control. Namely, suppose P and P' are the powers corresponded to the data C and data C', respectively, (P−P') is an amount which is saved.

Moreover, when it is no longer possible to further save power even if the power save adaptor 19 instructs to save power, a power demand invalid signal is sent back to the power demand controller 11 through the power save controller 9. In this case, the power cut adaptor 31 is so controlled that the air conditioner is switched off through the power cut controller 27. It should be appreciated that the power demand controller 11 can be so constructed that the air conditioner can be switched off directly via the power cut controller 27 and the power cut adaptor 31 when the current of the whole system exceeds, say, 95% of the contract current.

In summary, by employing a power demand controlling system according to the present invention, that a large power is jumped back after the release of the power demand control is avoided by that the power is increased gradually and stepwise per a predetermined period of time after the power demand control is cancelled, thus achieving a significantly efficient and stable power demand control.

Moreover, for a two-stage detection system where there are two operational modes of power save ON and OFF, the hunting is suppressed to a minimum according to the present invention and a simpler circuit is realized than the conventional electric circuit in a multistage detection system where there are several different levels between ON and OFF. Since in the present invention there is provided a control system independently for each one of plural air conditioners by, for example, varying a time constant (random number) thereof at the time of power being returned to the original, there will no longer be necessitated an extra system found in the conventional practice. Thus, the power demand controlling system can be produced economically. Moreover, for the split type air conditioner, there is provided signal converting means such as the power save adaptor 19 connected between the indoor unit and the outdoor unit through communication lines. When the signal converting means receives the power save requesting signal and a capacity control signal (the signal being instructed from the indoor unit toward the outdoor unit), the signal converting means converts the capacity control signal to a signal instructing a capacity which is less than the capacity instructed by the indoor unit so as to be transmitted to the outdoor unit. As a result, the power demand control system can be easily and economically built into an already available air conditioner or the like, and can be easily placed in a limited space.

Moreover, there is provided a power cut controller 27 having an HA terminal for receiving a control signal from an external unit and an HA terminal for the air conditioner, where a control signal from the external unit is received through the HA terminal for the external unit, and the received signal as well as a power cut requesting signal can be sent to the air conditioner through the air-conditioner-use HA terminal of the power cut controller 27. Thus, it is made possible to operate combinedly a normal telephone control unit and a power demand controlling system.

Moreover, by employing the power demand controlling system according to the present invention, when the power save requesting signal is received, the working power prior to the receipt of the power save requesting signal is compared to the working power after the receipt of the signal so as to output a power demand valid/invalid signal, thus realizing a highly reliable power demand controlling system.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. A power demand control system for saving power of a plurality of output variable apparatus where power is supplied through domestic power lines, comprising:
    power demand controlling means for detecting and monitoring constantly an electric current flowing through the domestic power lines; and
    a plurality of power save controlling means, connected to the domestic power lines and each connected to a corresponding one of the output variable apparatus and receiving a power save request signal for the corresponding apparatus from said power demand controlling means based on the electric current monitored by the power demand controlling means, for reducing an output of the corresponding apparatus to a minimum value in response to the power save request signal and after the power save request signal is cancelled, for returning the output of the corresponding apparatus gradually and stepwise to an original value,
    wherein when the power save request signal is sent simultaneously to the apparatus, a time constant used to gradually and stepwise return the apparatus to the original value, is made variable for each individual apparatus so as to shift slightly, with respect to each other, the timing in which the output of the individual apparatus are returned to the original value.

2. A power demand control system for saving power of split-type air conditioning apparatus including an indoor unit and an outdoor unit where power is supplied through domestic power lines, comprising:
    power demand controlling means for detecting and monitoring constantly an electric current flowing through the domestic power lines;
    power save controlling means, connected to the domestic power lines and coupled to the apparatus and receiving a power save request signal for the apparatus, based on the electric current monitored by the demand controlling means, for reducing an output of the apparatus to a minimum value in response to the power save request signal and after the power save request signal is cancelled for returning the output of the apparatus gradually and stepwise to an original value; and
    power save adaptor means, connected to the power save controlling means and the indoor unit and the outdoor unit, for receiving the power save request signal from the power save controlling means and for controlling communication between the indoor unit and the outdoor unit of the split-type air conditioning apparatus.

3. The system of claim 2, further comprising:
    a plurality of the split-type air conditioning apparatus;
    a plurality of power save controlling means; and
    a plurality of power save adaptor means, each of said power save controlling means and said power save adaptor means corresponding to one of the apparatus,
    wherein when the power save request signal is sent simultaneously to each of the individual apparatus a time constant used to gradually and stepwise return the output of the individual apparatus to the original value is made variable so as to shift slightly, with respect to one another, the timing in which the output is returned to the original value.

4. A power demand control system for saving power of output variable apparatus having a home automation (HA) terminal, by means of a command from a telephone unit, where power is supplied through domestic power lines, comprising:
    power demand controlling means for detecting and monitoring constantly an electric current flowing through the domestic power lines;
    power cut controlling means, having an HA terminal, the power cut controlling means being connected to the domestic power line and the output variable apparatus and receiving a power save requesting signal from the power demand controlling means; and
    telephone controlling means, having an HA terminal, connected to the HA terminal of the power cut controlling means for switching on and off the output variable apparatus based on the command from the telephone unit.

5. The system of claim 4, wherein the power cut controlling means comprises:
    means for demodulating a power line carrier wave signal;
    means for receiving the demodulated power line carrier wave signal and extracting a power cut signal therefrom;
    computing means for receiving the extracted power cut signal, connected to the HA terminal for the telephone controlling means and the HA terminal for the apparatus; and
    switch means for stopping the apparatus.

6. A power demand control system, for saving power of split-type air conditioning apparatus including an indoor unit and an outdoor unit and further having a home automation (HA) terminal, by means of a command from a telephone unit, where power is supplied through domestic power lines, comprising:
    power demand controlling means for detecting and monitoring constantly an electric current flowing through the domestic power lines and for producing a power save request signal on the basis of the electric current;
    power cut controlling means, having an HA terminal, connected to the domestic power lines and the apparatus, for cutting power to the apparatus;
    telephone controlling means, having an HA terminal connected to the HA terminal of the power cut controlling means;

power cut adaptor means, connected to the telephone controlling means and the power cut controlling means, for providing proper control of the apparatus when power demand control is no longer possible;

power save controlling means, connected to the domestic power lines and the apparatus, and receiving the power save request signal for the apparatus for reducing an output of the apparatus to a minimum value in response to the power save request signal and after the power save signal is cancelled for returning the output of the apparatus to an original value; and power save adaptor means, connected to the power save controlling means and the indoor unit and the outdoor unit, for receiving the power save request signal from the power save controlling means and for controlling communication between the indoor unit and the outdoor unit of the split-type air conditioning apparatus.

7. The system of claim 6, wherein the power save controlling means returns the output of the apparatus gradually and stepwise to the original value thereof.

8. A method for saving power of output variable apparatus where power is supplied through domestic power lines, comprising the steps of:
   detecting and monitoring an electric current flowing through the domestic power lines;
   sending a power save signal to the output variable apparatus;
   reducing an output of the apparatus to a minimum value; and
   returning the output of the apparatus gradually and stepwise to an original value, when the power save signal is cancelled.

9. A method for saving power of a split-type air conditioning apparatus, including an indoor unit and an outdoor unit where power is supplied to the apparatus through domestic power lines, in response to a power save signal produced on a basis of electric current on the domestic power line, comprising the steps of:
   monitoring whether the power save signal is produced;
   receiving indoor unit data;
   receiving outdoor unit data;
   transmitting the indoor unit data directly to the outdoor unit when the power save signal is not produced;
   converting the indoor unit data to a predetermined power demand level and transmitting the converted data to the outdoor unit when the power save signal is produced; and
   transmitting the converted data from the outdoor unit to the indoor unit.

10. A method for saving power of output variable apparatus having a home automation (HA) terminal, by means of a command from a telephone unit, where power is supplied through domestic power lines and using power cut controlling means for cutting off power to the apparatus and power demand controlling means for detecting a current flowing through the domestic power lines, the method comprising the steps of:
    (a) checking through the Ha terminal of the apparatus whether the apparatus is operating or not;
    (b) letting a status of an HA terminal of the power cut controlling means be OFF if the apparatus is not operating in step (a);
    (c) checking whether there is a signal from a telephone controlling means connected to the telephone unit;
    (d) returning to step (a) if there is no signal from the telephone controlling means in step (c);
    (e) letting a status of the HA terminal of the power cut controlling means connected to the telephone controlling means be ON if there is a signal from the telephone controlling means in step (c), switching on the apparatus and then returning to step (a);
    (f) letting the state of the HA terminal of the power cut controlling means be ON if the apparatus is operating in step (a);
    (g) demodulating a signal sent from the power demand controlling means in order to check whether the signal is a power cut signal or not;
    (h) monitoring the HA terminal of the power cut controlling means connected to the apparatus to check whether the apparatus is ON or not if there is no power cut signal in step (g);
    (i) switching on the apparatus if the apparatus is OFF in step (h);
    (j) monitoring the HA terminal of the power cut controlling means connected to the telephone controlling means to check whether the apparatus is ON or not if the signal is the power cut signal in step (g);
    (k) switching off the apparatus and proceeding to step (l) if the apparatus is ON in step (j);
    (l) monitoring the HA terminal of the power cut controlling means connected to the telephone controlling means to check whether there is a signal from the telephone controlling means;
    (m) checking whether an OFF switch, provided in the power cut controlling means, for switching off the apparatus is operating or not if there is no signal from the telephone controlling means in step (l);
    (n) returning to step (g) if the OFF switch is not operating in step (m);
    (o) letting the status of the HA terminal of the power cut controlling means connected to the telephone controlling means be OFF if the OFF switch is operating in step (m);
    (p) monitoring the HA terminal of 1the power cut controlling means connected to the telephone controlling means to check whether the apparatus is ON or not;
    (q) returning to step (a) if the apparatus is OFF in step (p); and
    (r) switching off the apparatus and returning to step (a) if the apparatus is ON in step (p).

11. A method for saving power of a power demand adaptive apparatus through power demand control where power is supplied through domestic power lines, comprising the steps of:
    (i) observing at the apparatus whether there is a power save signal from power demand controlling means through power save controlling means;
    (ii) terminating the power demand control to the apparatus when there is no power save signal in step (i);
    (iii) starting the power demand control when there is the power save signal in step (i);
    (iv) comparing a power prior to the power demand control with a power after the power demand control;
    (v) outputting a power save valid signal to the power save controlling means when the power prior to the power demand control is greater than the power after the power demand control; and
    (vi) outputting a power save invalid signal when the power prior to the control is equal to or greater than the power after the control.

* * * * *